Patented Aug. 29, 1950

2,520,597

UNITED STATES PATENT OFFICE 2,520,597

METHOD OF MAKING FLOUR SIZE

Ira L. Griffin, Charlotte, N. C.

No Drawing. Application January 2, 1947,
Serial No. 719,915

7 Claims. (Cl. 127—32)

My invention relates to the treatment of dry-milled flour to obtain desired viscosity upon cooking and render the cooked flour suitable for use as a size on textiles, particularly warp yarns.

Starch is universally used for sizing textiles, and numerous attempts have been made heretofore, but without success, to use dry-milled flour, which is generally more available and less expensive. The main difficulty with flour is that it varies widely in viscosity when cooked; also, it tends to lump or agglomerate and not give an even, smooth, sizing film on the textiles.

It has been thought heretofore that the gluten, protein and oil constituents of flour were the cause for the failure of the flour to work satisfactorily as a size. I have discovered, in accordance with my invention, that the hydrolytic effect on the flour of the enzymes present in the flour during the usual cooking operation is the prime contributing factor to the widely varying viscosity in the cooked size, and that this adverse effect can be eliminated by deactivating the enzymes with high temperature right at the time of preparing the cooked flour size.

In accordance with my invention, I make a slurry of the dry-milled flour and water and quickly raise the temperature of this slurry sufficiently to destroy or deactivate the enzymes present, before they have an opportunity to exert any appreciable hydrolytic action on the flour. One convenient procedure for heating the slurry is to run it into a vessel of boiling water. But it is to be understood that any other suitable method or means for quickly heating the flour slurry, such as for example, a "Votator" machine, having a heated, rotating enclosed, cylinder, may be used.

As a result of the process of my invention, I have produced, for the first time, a commercially satisfactory yarn size from dry-milled flour that contains the protein, gluten, enzymes and all of the other natural constituents along with the starch component normally present in the flour. This heretofore unobtainable but highly desirable result is made possible by preventing the usual converting action of the enzymes on the flour; especially the hydrolyzing action of the amylolytic enzymes on the starch content of the flour, with the usual resulting variation in viscosity.

One of the primary causes for the wide variation in viscosity of sizes made from flour is the natural variation in enzyme content or activity of the flour. Flour produced by the usual dry-milling operations, from cereal grains, such as wheat, grown in different localities with varying weather conditions and stored under different conditions, have widely varying enzyme content or activity. The variations in enzymes from batch to batch of such flour may be as high as 400%. To simulate these natural variations in enzyme content of the flour and to determine the effect thereof on the viscosity of the cooked flour, I made up five flour slurries in which I varied the enzyme content over this wide range, by adding to flour containing an original alpha-amylase enzyme content of 0.13 unit, multiples of this amount of the same enzyme obtained from malted wheat, so that the resulting total enzyme content of each flour batch was as follows:

| | |
|---|---|
| No. 1 | 0.13% enzyme |
| No. 2 | 0.26% enzyme |
| No. 3 | 0.39% enzyme |
| No. 4 | 0.52% enzyme |
| No. 5 | 0.65% enzyme |

Flour and water slurries were made for each of the above, and they were separately cooked in a manner favoring enzyme action; that is, the total solids were suspended in the total volume of water at room temperature and the temperature raised to 160° F. at a rate of about 5° per minute. The temperature was then maintained at 160° F. for five minutes and then raised to 210° F. at about 5° per minute and then cooked for thirty minutes on the boiling water bath. The viscosities of the resulting cooked slurries as measured with a standard pipette are shown in the following table:

Table #1

| | Seconds |
|---|---|
| No. 1 | 87.0 |
| No. 2 | 61.0 |
| No. 3 | 22.0 |
| No. 4 | 14.0 |
| No. 5 | 11.0 |

The above pipette is a standard, viscosity measuring device, and water tested therein required 5 seconds time to deliver 50 cc. of water. It will be noted from the above table that the viscosities of the cooked flour slurries varied as much as about 800% between the highest and lowest viscosity. And this illustrates the wide variations in viscosities that are obtained with different batches of flour in which the enzyme content widely varies; and accordingly the unpredictability and unreliability of such a product for use as a textile size, which requires strict viscosity control.

Now, to illustrate the effectiveness of my invention for preventing these variations in viscosity and to produce a satisfactory textile size from flour, I made up five slurries using the same flour as above and added thereto the same type of enzyme as described above and in quantities of 0.25% to 1.00% added enzyme as follows:

No. 1 contained no added enzymes;
No. 2 contained 0.25% malted wheat on dry flour;
No. 3 contained 0.50% malted wheat on dry flour;
No. 4 contained 0.75% malted wheat on dry flour;
No. 5 contained 1.0% malted wheat on dry flour.

The flour slurry in each case was promptly subjected to an enzyme-deactivating, heat treatment as follows:

9 parts flour (with added enzyme) is slurried with 20 parts water at room temperature. This slurry is poured with agitation into 80 parts of water heated to boiling or near boiling temperature. The slurry is added at such a rate that the temperature of the resulting mixture does not drop below 200° F. or thereabouts. The enzymes are thus inactivated by heat before much splitting of the starch polymer occurs.

Five cooks were prepared by the slurry method as described above and then cooked 30 minutes on the boiling water bath. The resulting cooked flour in each case was then tested for viscosity, at 210° F., using the above standard pipette which delivers 50 cc. of water at 210° F. in five seconds. The bodies of all five of these cooks were identical in that they were too heavy to be measured with the standard pipette. About 20 cc. would drip and then the flow would cease completely.

The above tests clearly illustrate the fact that the enzymes are inactivated when the slurry is subjected promptly to the elevated temperature and before the enzymes have had an opportunity to cause a partial conversion or liquefaction of the starch. In this operation it is important to prevent the temperature from dropping below the enzyme deactivating temperature, which is usually around 180° F.–190° F. Preferably, the temperature should be maintained at about boiling temperature, i. e., 212° F.

In preparing the flour and water slurry for enzyme deactivation, as above described, I have obtained good results from the following illustrative but non-limiting example.

35 gal. water
½ lb. of Dowicide A or G (preservative)
120 lbs. (80% extraction) wheat flour The slurry made according to the above formula gives a volume of about 40 gals., and in a typical case this volume of slurry may be pumped into a vessel containing 80 gals. of water heated to 212° F. The steam supply or other means for heating the water is so regulated that the temperature of the resulting mixture of water and flour slurry does not fall below about 190° F. at any time during the mixing operation.

In the above example, calcium chloride or glycerine or other hygroscopic agents may be used if desired. However, I have found that they can be omitted in my composition because of the protein constituent of the flour which is water absorptive. This characteristic permits use of my composition in the weave room with lower relative humidity than is normally required for starch warp size compositions.

The Dowicide or other preservative functions in conventional manner to preserve the slurry against bacteria action.

As shown in the tests described hereinabove in which the enzymes naturally occuring in the flour are deactivated by the heat of the boiling water, the viscosities of the flour sizes were not reduced as they were when the slurries were made up without enzyme deactivation. In fact, as shown above, the viscosities of the resulting cooked slurries when enzyme deactivation was used, were identical and the slurries were too heavy or viscous to be measured with the standard pipette. Although this uniformity in viscosity of different slurries, made up from different batches of flour, is a highly desirable characteristic, the resulting heavy slurries (of uniform viscosity) are sometimes too viscous to be used for sizing of certain warps. And it, therefore, becomes desirable to reduce the viscosity of these slurries to give a thinner or more fluid type of size. I have discovered that this additional desirable result can be obtained by use of an oxidizing agent, as follows:

The flour size is made up in accordance with my process, as described above, without encountering any thinning action by the enzymes since they have been deactivated. The size is then heated in a kettle at about 200° F. to 212° F. for about 5 to 10 minutes, or for sufficient length of time to effect rupturing of the starch granules so that they can be attacked by the oxidizing agent. I have found that if the oxidizing agent is added prior to the rupturing of the starch granules, the protein content of the flour size will absorb the oxygen liberated by the oxidizing agent and the latter will become ineffective for attacking the starch and reducing the viscosity. However, after a short heating period in which the starch granules are ruptured, the oxidizing agent will attack these granules and will reduce the viscosity of the starch to the desired extent. This reduction can be easily and nicely controlled by regulating the amount of oxidizing agent used.

The well-known oxidizing agents, such as for example, sodium perborate, hydrogen peroxide and barium peroxide, may be used. I have obtained very good results with sodium perborate, and the necessary amount usually varies from about ½% to 2% of sodium perborate based on the weight of the dry flour used in the flour size. This sodium perborate is added to the flour size or slurry after it has been cooked for about 5 to 10 minutes at boiling temperature, as described above, to rupture the starch granules. This high temperature of the flour size decomposes the oxidizing compound added thereto, and makes the total quantity of liberated oxygen available for thinning the flour size. The net result of first deactivating the enzymes to prohibit them from changing the viscosity of the flour, and then thinning the flour size by use of an oxidizing agent, is the production of a good flour size of predeterminable and reliable viscosity, which viscosity may be varied accurately as desired.

The flour size composition described above as resulting from the process of my invention may be applied to warp yarns or other textiles in the same or similar manner to that commercially employed for applying the pure starch size to these materials. The protein content of my flour size appears to have a good plasticizing action and the size quickly and thoroughly penetrates the warp yarns. I have found in actual mill tests that the flour composition of my invention produces results not only equal, but in certain respects superior to, the results obtained in the usual starch sizing operation, and the invention therefore makes it possible to utilize for the first time on a satisfactory commercial scale the flour resulting from dry mill operations. This flour may be obtained from the usual wheat, rye, or barley or other cereal grains; or it may be obtained from tubers such as Irish potatoes and sweet potatoes.

Various modifications and changes may be made in the above described process, materials and equipment without departing from the scope of my invention as defined in the appended claims.

I claim:

1. A method of preparing a textile sizing composition from dry-milled proteinaceous flour, comprising preparing a pumpable aqueous slurry of the dry-milled flour which contains more water than flour and the natural enzyme constituents of the flour, instantly raising the temperature of this slurry sufficiently high to deactivate the enzyme constituents of the flour in liquid state, and then cooking the resulting flour slurry to produce a textile sizing composition of desired viscosity and other characteristics.

2. A method of preparing a suitable sizing composition for textiles from dry-milled wheat flour, comprising making up a pumpable cold water slurry of the dry-milled flour which contains more water than flour and the enzyme constituents of the flour, promptly heating the slurry to a temperature of not less than about 180° F., which temperature quickly destroys the usual action of the enzyme constituents of the flour, and then cooking the resulting flour slurry to produce a textile sizing composition of desired viscosity and other characteristics.

3. A method of preparing a suitable sizing composition for textiles from dry-milled wheat flour, comprising making up a cold water slurry of the dry-milled flour which contains the enzyme constituents of the flour, immediately introducing this aqueous dispersion of the flour into water heated to a temperature of not less than about 190° F., which temperature quickly destroys the usual action of the enzyme constituents of the flour, and then cooking the resulting flour slurry to produce a textile sizing composition of desired viscosity and other characteristics.

4. A method of preparing a suitable sizing composition for textiles from dry-milled wheat flour, comprising making up a cold water slurry of the dry-milled flour which contains the enzyme constituents of the flour, immediately introducing this aqueous dispersion of the flour into water heated to a temperature of not less than about 190° F., which temperature quickly destroys the usual action of the enzyme constituents of the flour, cooking the resulting flour slurry to produce a textile sizing composition, then adding an oxidizing agent to the mixture to cause the mixture to have the desired viscosity.

5. That method of preparing a sizing compound which comprises making a cold water slurry from dry-milled wheat flour which contains the natural enzyme constituents of the flour, then immediately introducing the slurry into a quantity of water heated to at least 180° F., maintaining the water and slurry at a temperature of at least 180° F. while the slurry is being introduced, then adding an oxidizing agent to the mixture to bring about the desired viscosity in the mixture.

6. That method of preparing a sizing composition for textiles from dry-milled wheat flour which comprises mixing the flour containing the natural flour enzyme constituents with tap water to form a slurry, then immediately feeding the slurry into hot water, maintaining the temperature of the water and slurry introduced therein high enough to deactivate the enzymes in the flour, then adding an oxidizing agent to the mixture of water and slurry to bring the mixture to the desired viscosity for application to a textile product.

7. That method of preparing a sizing solution for application to textiles which comprises mixing ordinary milled wheat flour containing the natural flour enzyme constituents with tap water to form a slurry, and immediately mixing the slurry with water heated to a temperature sufficient to deactivate the enzymes in the slurry, and then adding to the mixture an oxidizing agent to bring the mixture to a viscosity suitable for application to textiles.

IRA L. GRIFFIN.

REFERENCES CITED

The following references are of record in the file of this patent:

UNITED STATES PATENTS

| Number | Name | Date |
|---|---|---|
| Re. 5,289 | Noah | Feb. 8, 1873 |
| 492,515 | Lobdell | Feb. 28, 1893 |
| 1,020,656 | Perkins | Mar. 19, 1912 |
| 1,313,658 | Wiggin | Aug. 19, 1919 |
| 1,969,347 | Bauer | Aug. 7, 1934 |
| 1,989,150 | Pierson | Jan. 29, 1935 |
| 2,148,016 | Gale | Feb. 21, 1939 |
| 2,202,573 | Coppock | May 28, 1940 |
| 2,409,085 | Vincent | Oct. 8, 1946 |

FOREIGN PATENTS

| Number | Country | Date |
|---|---|---|
| 16,997 | Great Britain | of 1913 |